US006860699B2

(12) United States Patent
Weis

(10) Patent No.: US 6,860,699 B2
(45) Date of Patent: Mar. 1, 2005

(54) STRADDLE LOADER

(75) Inventor: Otto Weis, Oberpleichfeld (DE)

(73) Assignee: Noell Crane Systems GmbH, Würzburg (DE)

( * ) Notice: Subject to any disclaimer, the term of this patent is extended or adjusted under 35 U.S.C. 154(b) by 0 days.

(21) Appl. No.: 10/437,531

(22) Filed: May 14, 2003

(65) Prior Publication Data

US 2003/0219332 A1 Nov. 27, 2003

(30) Foreign Application Priority Data

May 15, 2002 (DE) ........................................ 102 21 479

(51) Int. Cl.[7] ................................................ B60P 3/00
(52) U.S. Cl. ...................................... 414/460; 187/269
(58) Field of Search ................................ 414/460, 461; 187/269

(56) References Cited

U.S. PATENT DOCUMENTS

| | | | | |
|---|---|---|---|---|
| 3,703,243 A | * | 11/1972 | Monk | 414/460 |
| 3,744,652 A | | 7/1973 | Rieschel | |
| 4,159,778 A | * | 7/1979 | Pueschner et al. | 414/460 |
| 4,480,714 A | | 11/1984 | Yabuta et al. | |
| 5,099,950 A | * | 3/1992 | Kishi | 182/18 |
| 5,139,110 A | * | 8/1992 | Kishi | 187/18 |
| 2002/0001515 A1 | | 1/2002 | Lukumaa et al. | |

FOREIGN PATENT DOCUMENTS

| | | |
|---|---|---|
| DE | 34 37 401 A1 | 8/1985 |
| DE | 36 03 874 A1 | 7/1987 |
| DE | 197 14 210 A1 | 10/1988 |
| DE | 195 25 695 A1 | 1/1997 |
| FR | 2 067 895 | 7/1971 |
| GB | 2 077 224 A | 12/1981 |
| WO | WO 86/03186 | 6/1986 |

* cited by examiner

*Primary Examiner*—Janice L. Krizek
(74) *Attorney, Agent, or Firm*—Cohen, Pontani, Lieberman & Pavane

(57) ABSTRACT

A straddle loader for lifting a load includes an upper frame having a spreader for grasping the load, a compartment for an operator, at least two traveling frames for receiving the load, and a lifting system connected to the upper frame and the plural traveling frames. The lifting system varies the distance between the upper frame and the plural traveling frames by uniformly transferring the load to the traveling frames so that the upper frame and the traveling frames remain parallel and perpendicular. The straddle loader further includes a plurality of telescoping beams associated with the lifting system so that at least two telescoping beams are connected to each of the traveling frames. Each telescoping beam is capable of extension and retraction. Stationary pivot shafts connect each end of each of the telescoping beams to the respective upper frame or traveling frame and to a pressure cylinder associated with each of the telescoping beams. The pressure cylinder is operatively mounted between one of the traveling frames and the respective one of the telescoping beams associated with the one frame and exerts a force on the respective telescoping beam simultaneous with extension of the telescoping beam.

13 Claims, 7 Drawing Sheets

STRADDLE LOADER

PRIORITY CLAIM

Priority is claimed for this invention and application, corresponding application No. 102 21 479.4 having been filed in Germany on May 15, 2002.

FIELD OF THE INVENTION

The present invention relates to a straddle loader and, more particularly, to loaders for containers used in shipping where the loader is a self-propelled ground vehicle.

BACKGROUND OF THE INVENTION

The straddle loader of the present invention is suitable for transporting containers and for stacking them on top of each other. The present straddle loader makes it possible to stack the containers, over which the loader is driven, to relatively great heights.

Straddle loaders by means of which containers can be stacked on top of each other in one or two rows are known. To produce higher stacks, full gantry cranes or other types of equipment are used; these are, however, relatively expensive.

German DE 197 14 210 A1 discloses a straddle loader that includes a lower frame and an upper frame and which can produce a tall stack by the operation of systems of scissors acting between the upper and lower frames. Each scissors has at least two parts, which are hinged together. This system suffers from the disadvantage, however, that the center of gravity of the container load can shift loading on the wheels to differ, depending on the height that the container to be transported has reached. In turn, the stability of the transporter and its driveability are impaired by these differences. The disclosed scissor design additionally suffers from the disadvantage that design measures must be provided to ensure sufficient stability of the loader.

It is, therefore, an object of the present invention to provide a straddle loader which does not operate on the scissor principle and which will not suffer disadvantages with respect to stability when loads must be transported at different heights.

SUMMARY OF THE INVENTION

A straddle loader according to the present invention includes a traveling frame having a drive and an upper frame with a load-lifting means and an operator's compartment. The distance between the upper frame and the traveling frame is variable using a lifting system.

At each side of the upper frame and traveling frame, a stationary pivot shaft for a telescoping beam is provided between the frame and the beam. Associated with each telescoping beam is a pressure cylinder that is attached between the traveling frame and a lower part of the beam, and that acts on each of four telescoping beams mounted on the straddle loader.

Without any change in the way that the load is introduced, the distance between the upper frame and the traveling frame is varied in a parallel and perpendicular manner by simultaneous movement of the multipart beams and the pressure cylinders. It is advantageous in this case for the telescoping beams, which are operated synchronously, to be operated with a lifting capacity in addition to the pressure cylinders.

It is also advantageous for the two telescoping beams on each side of the straddle loader to cross each other and for a single drive to be provided on each side of the vehicle to operate the two beams.

It is further advantageous to provide a height-adjustable bracing element between two beams that cross each other at the crossing points between them so that the two beams can be braced together at any height.

The telescoping beams include several beam parts, preferably three. Supports and deflecting pulleys for extension and return cables are mounted within the beam parts. More specifically, a deflecting pulley is mounted on the stationary pivot shaft at the bottom end of a lower beam part, and a support with a pulley at the top end is also provided within this lower part. The middle beam part is provided with a support with a pulley at the bottom end and with another support with a pulley at the top end, at which an extension cable leads from the drive and proceeds via a pulley on the stationary pivot shaft to a deflecting pulley on the support in the lower beam and, from there, to an attachment point on the middle beam part. Another extension cable leads from the middle beam part and proceeds via a deflecting pulley on a support to an attachment point on the upper beam. When the extension cables are actuated, the beam parts of all of the beams can be shifted upward simultaneously.

Return cables are provided to ensure smooth retraction of the beam parts. One of the return cables leads from the drive and proceeds, via a deflecting pulley on the stationary pivot shaft, to an attachment point on the middle beam. Another return cable leads from its attachment point on the lower beam, via a deflecting pulley on the support, to an attachment point on the upper beam part.

Parallel deflecting pulleys are mounted on the stationary pivot shafts, so that both the return cables and the extension cables can be deflected on the same axis.

It is advantageous for the drive to be an electric motor, although other types of motors can also be used.

It is also advantageous for the drive motor to drive a four-track cable drum. This arrangement has the advantage that the two telescoping beams on each side of the vehicle can be driven by a single drive, one mounted on the left side of the vehicle, the other on the right.

The operator's compartment is always accessed using an extension ladder. The straddle loader thus meets high safety requirements for its operating personnel.

Adjustable "energy chains" are mounted on the telescoping beams to supply a power and/or control connection.

The vehicle drive may be mounted on the upper frame and/or on the traveling frame. A set-down shock absorber is mounted on the spreader to prevent vibrations.

It is important that the vehicle always travel at a speed suited to its height. Thus, driving speed control devices are provided to automatically regulate the speed of the vehicle as a function of its height. To ensure that the vehicle can be driven easily and safely in the alleys between containers, a lateral adjustment device is provided on the spreader.

Bracing elements are installed on the pivot shafts to provide support without play. It is also advantageous to incorporate bracing elements in the individual beam parts; these may, for example, be tension bars attached to the top or bottom of the beam parts. As a result, these parts of the beam form a rigid structure. The bracing elements in the beam parts are adjustable from a central location and can be actuated either automatically or by hand.

Other objects and features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the various figures.

DETAILED DESCRIPTION OF THE PRESENTLY PREFERRED EMBODIMENTS

Figure 1:
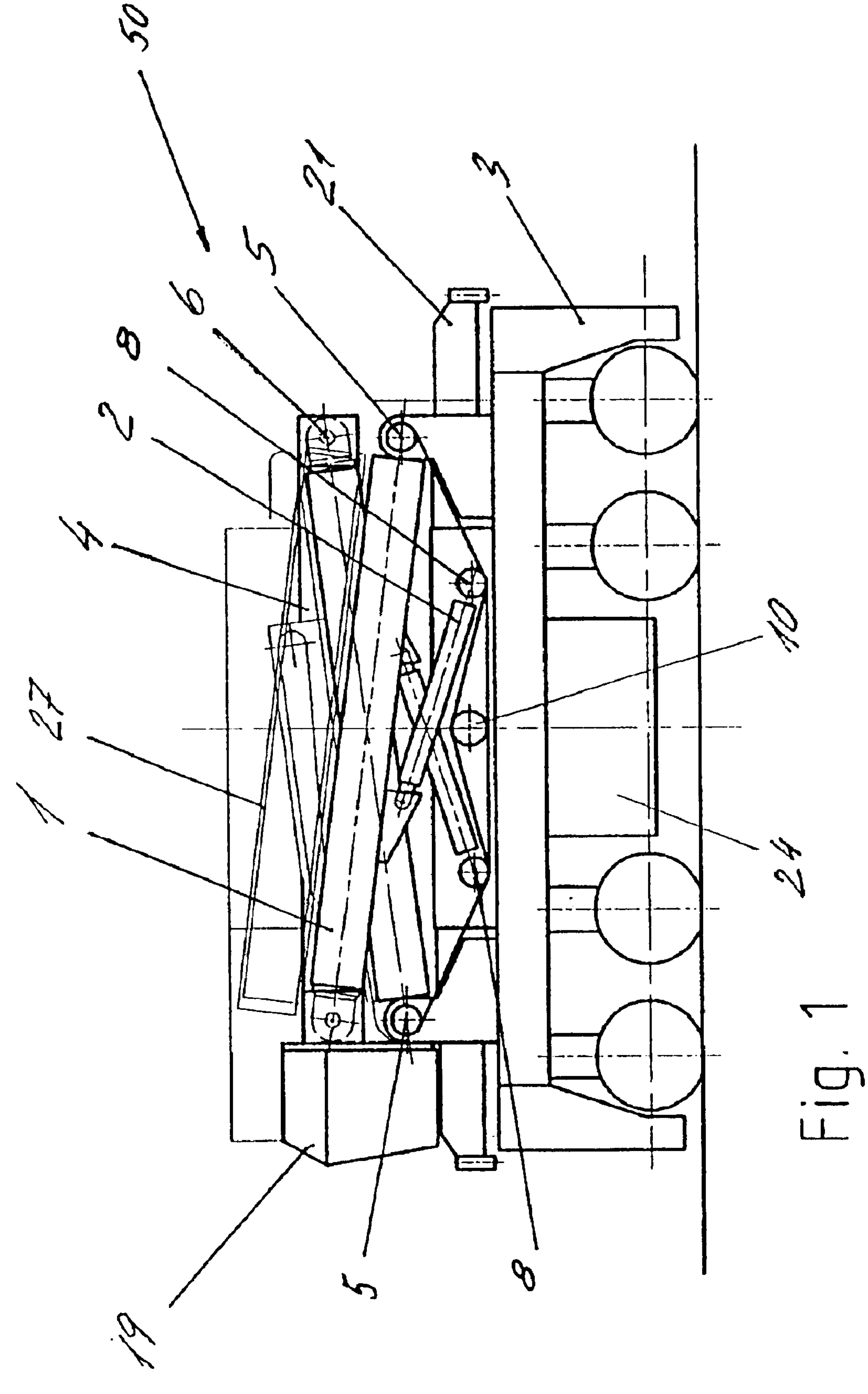
FIG. 1 is a side elevational view of a straddle loader according to the present invention with retracted beams.

FIG. 1 shows a straddle loader 50 that includes an upper frame 4 and two traveling frames 3. An operator's compartment 19 is mounted on the upper frame 4, and two pressure cylinders 2 and two telescoping beams 1 are mounted between the upper frame 4 and the traveling frame 3 on each side of the vehicle. A drive 10 for the set of telescoping beams 1 is mounted between stationary pivot shafts 5, 6, one of which is located at each end of frame 3. The drive 24 for the vehicle is mounted on traveling frame 3.

To reach the operator's compartment 19, an extension ladder 27 is attached to telescoping beam 1; ladder 27 adjusts its length in correspondence with the length of beam 1.

Figure 2:
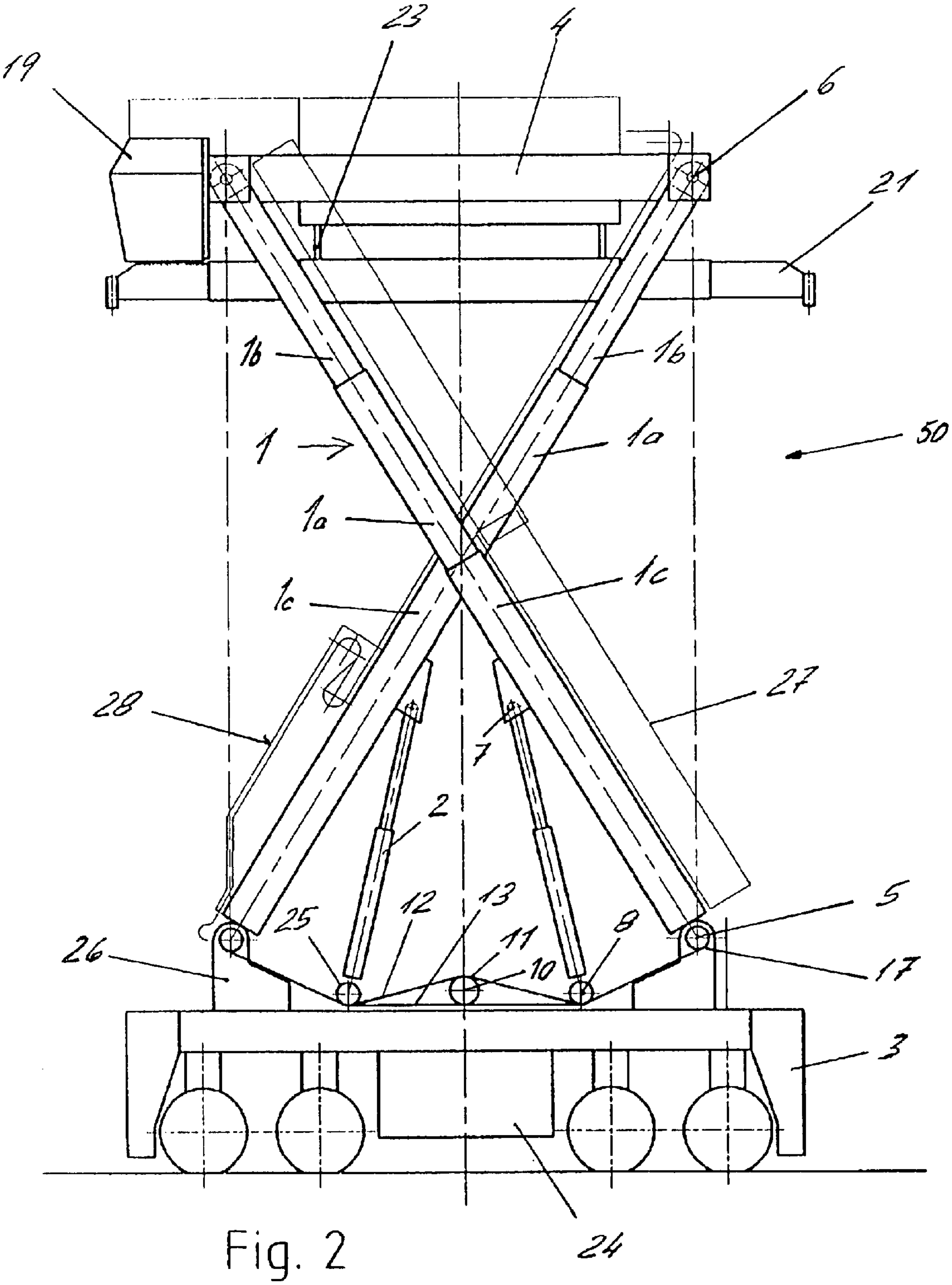
FIG. 2 is a side elevational view of a straddle loader according to the present invention with extended beams.

In FIG. 2, each end of straddle loader 50, upper frame 4 and traveling frame 3 are connected to the telescoping beams 1 by way of stationary pivot shafts 5, 6. Pressure cylinders 2 are connected by hinges 7, 8 to the traveling frame 3 and to the lower beam part 1*c*. Extension and return cables 12, 13 lead from the drive 10 and cable drum 11, which is implanted as a four-cable drum, over a deflecting pulley 17 disposed on the stationary pivot shafts 5 located at each end of pulleys 9 disposed in telescoping beams 1. The pivot shafts 5 and deflecting pulleys 17 are mounted on bearing blocks 26.

The extension ladder 27 allows the operator to leave the operator's compartment 19 even after the beams 1 have been extended.

An adjustable energy chain 28 is provided on one telescoping beam 1 for supplying a power and/or control connection.

The deflecting pulleys 25 for extension cable 12 are mounted on hinges 8.

A spreader 21 is engageable with a container 20 to raise and lower the container. A spreader set-down shock absorber 23 is located between the upper frame 3 and spreader 21 and prevents the vehicle from vibrating when spreader 21 is set down onto a container 20.

Figure 4:
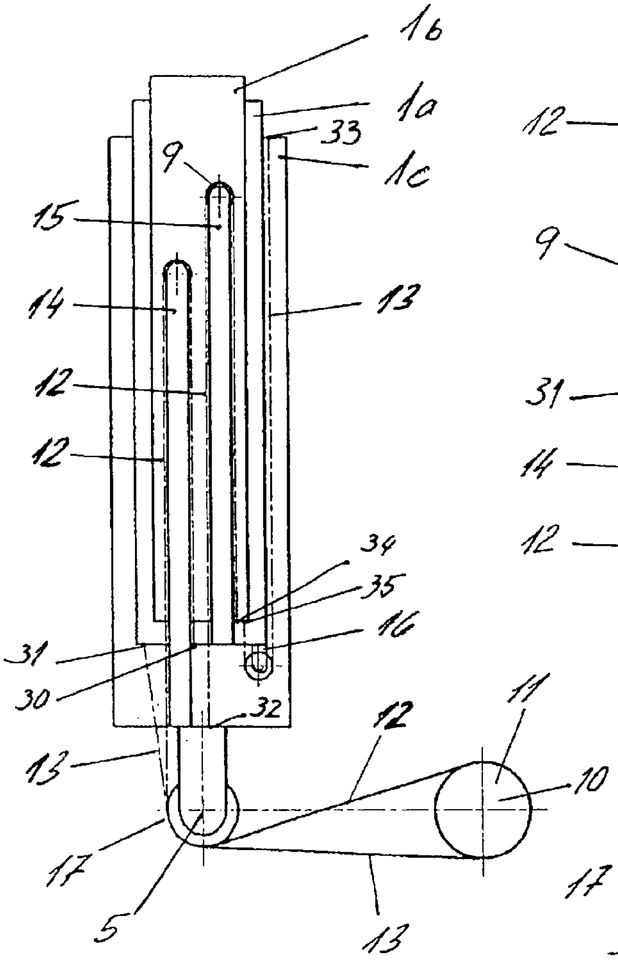
FIG. 4 is a schematic view of a telescoping beam with a retracted cable drive.
Figure 5:
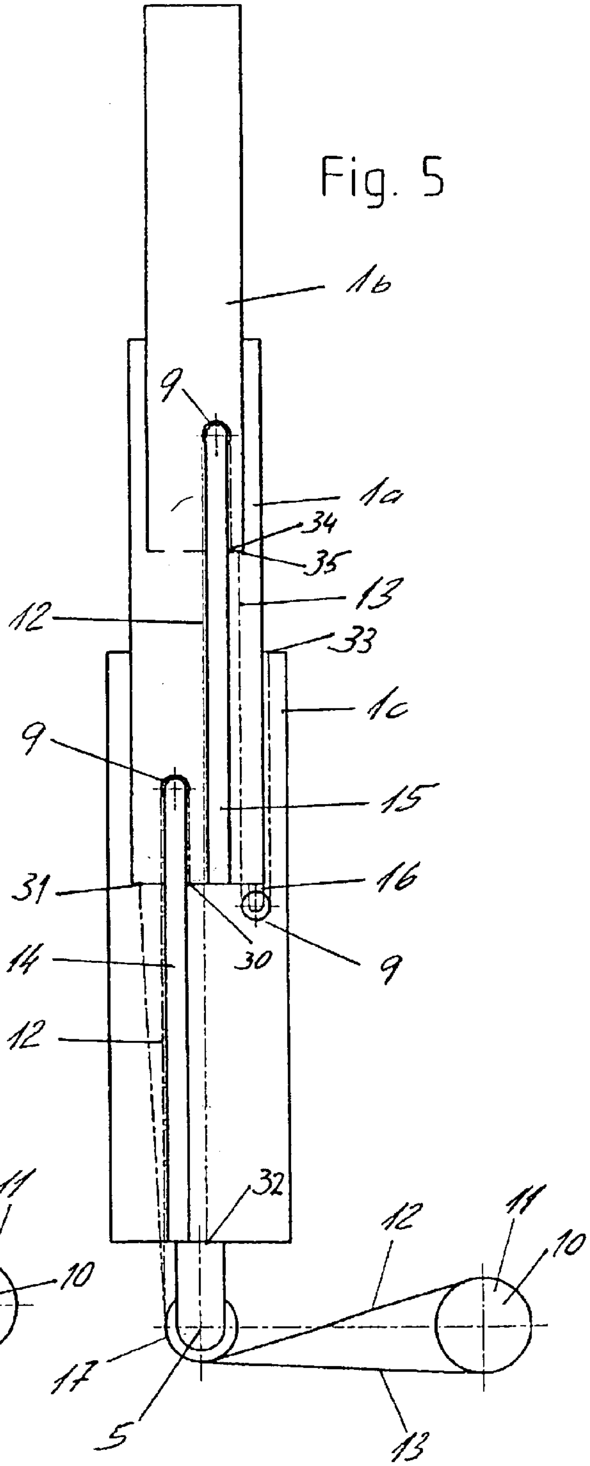
FIG. 5 is a schematic view of a telescoping beam with an extended cable drive.

FIGS. 4 and 5 depict the construction and functioning of the telescoping beams 1, 1*a*, 1*b*, 1*c*. Extension cable 12 leads into lower beam part 1*c* and then proceeds, by way of a support 14 and its pulley 9, to an attachment point 30 at the bottom end of middle beam part 1*a*. Another extension cable 12 leads, from a point 32 at the bottom end of lower beam part 1*c*, by way of a support 15 and its pulley 9 to a point 34 on upper beam part 1*b*.

All three beam parts 1*a*, 1*b*, 1*c* are connected to each other by return cables 13. A first return cable 13 leads from a point 35 on the bottom end of upper beam part 1*b*, over a pulley 9 on support 16, to a point 33 at the top end of lower beam 1*c*. Another return cable 13 leads from a point 31 on the bottom end of the middle beam 1*a*, via a pulley 17 on stationary pivot shaft 5, to cable drum 11.

Figure 6:
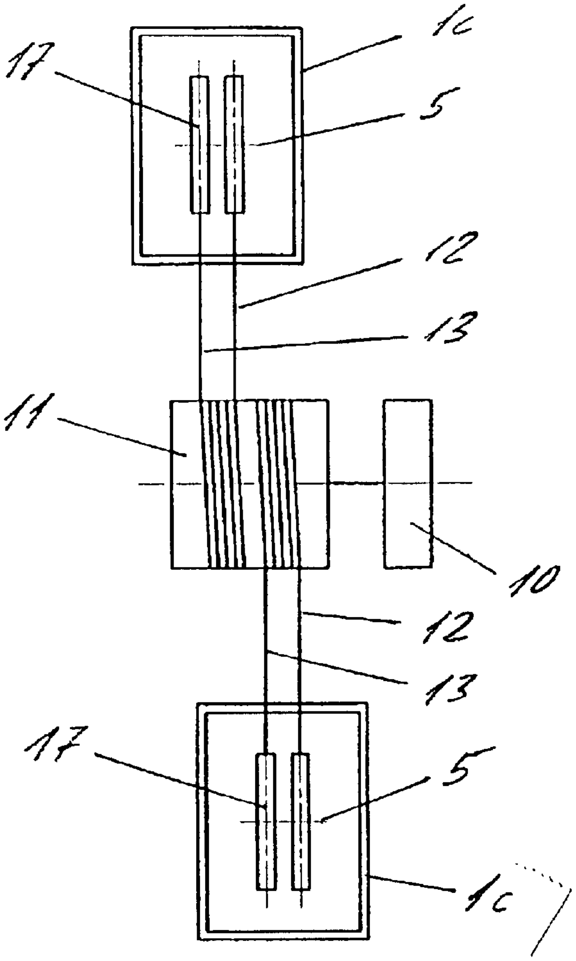
FIG. 6 is a schematic view of a four-track cable drum with parallel deflecting pulleys on the stationary pivot shaft of the traveling frame.

FIG. 6 illustrates the cable drum 11 and drive 10 during extension and return of cables 12, 13. Pulleys 17 are mounted on the axes of stationary pivot shafts 5 under the two telescoping beams 1. Thus, a single drive 10 operates each set of telescoping beams 1 of straddle loader 50 synchronously and simultaneously. At the same time, pressure cylinders 2 are retracted and extended to evenly load traveling frame 3. The upper frame 4 is thereby advantageously not subject to twisting during transport of 2 container 20, and the straddle loader 50 accordingly exhibits a high degree of stability.

FIG. 6 shows the lower beam parts 1*c* between which a cable drum 11, driven by motor 10, is installed. The drum pays out or winds up the extension cable 12 and return cable 13 of each beam part 1*c*. The cables 12, 13 are deflected into beam 1*c* by the deflecting pulleys 17 on pivot shaft 5.

Figure 7:
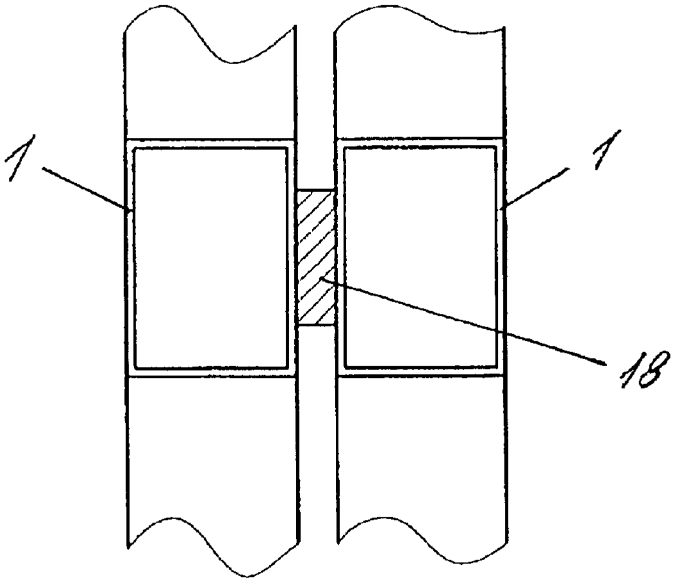
FIG. 7 is a schematic view of crossing telescoping beams with a bracing device.

To achieve high stability between telescoping beams 1, it is has been found effective to brace the lower beam parts 1*c* together by means of bracing elements 18, as shown in FIG. 7.

Figure 3:
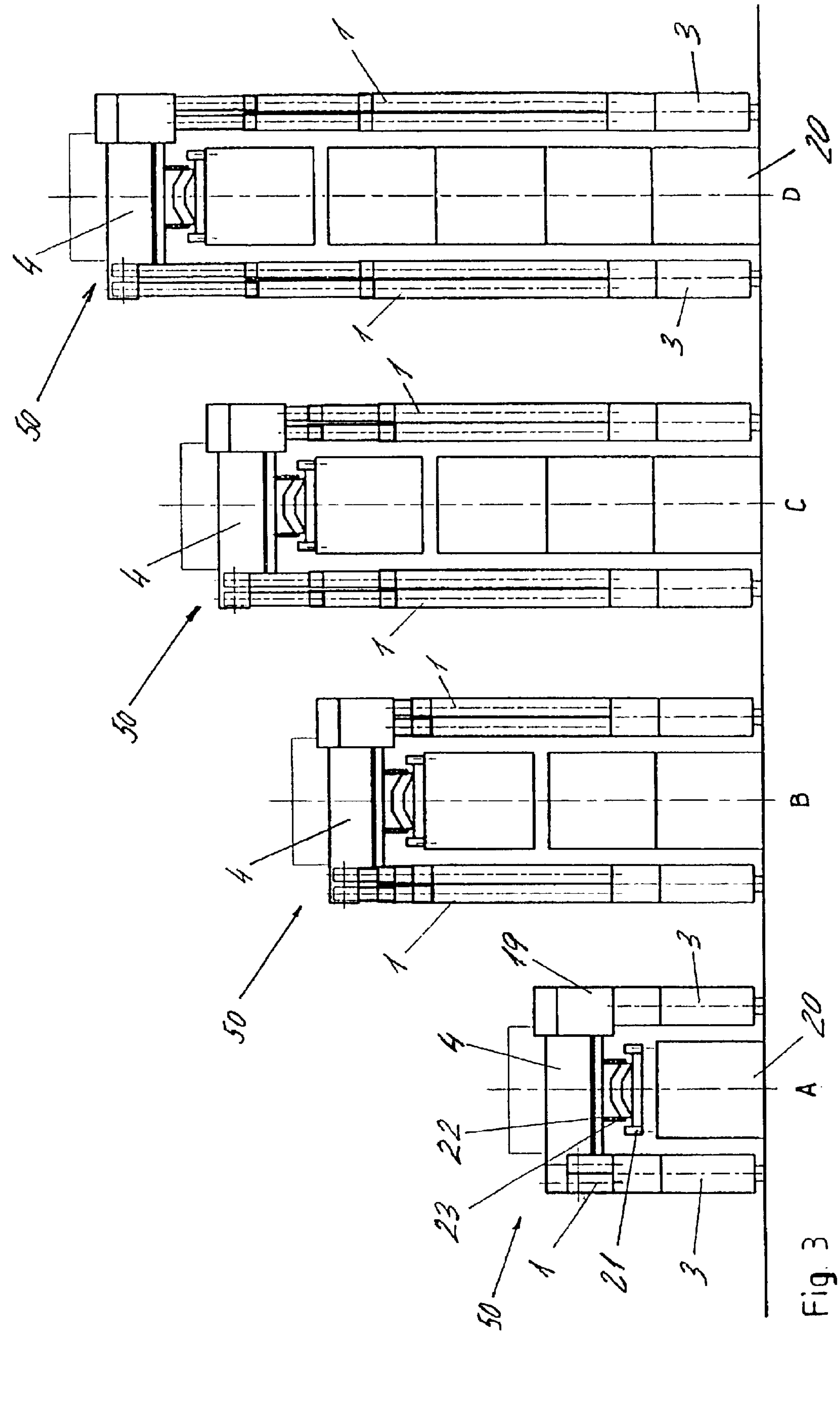
FIG. 3 is an end elevational view of a straddle loader according to the invention in four different working positions above stacks of containers.

FIG. 3 presents a view of straddle loader 50 according to the present invention in specific working positions A-D with upper frame 4 at various lifting heights above containers 20. The traveling frames 3 have separate but synchronously operating parts on each side of the container 20 to be straddled.

Figure 8:
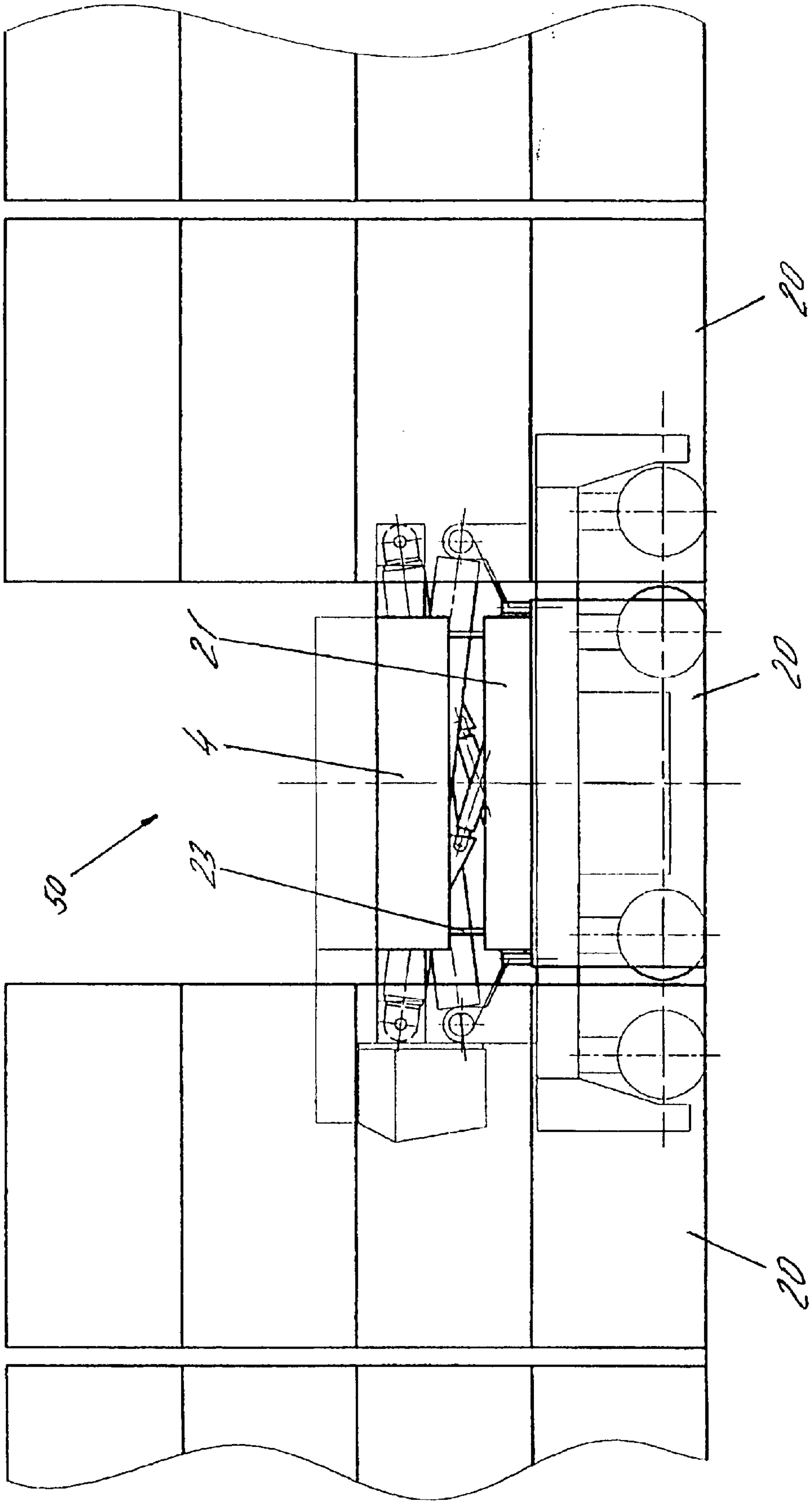
FIG. 8 is a side elevational view of stacks of containers and a straddle loader between the container stacks.

FIG. 8 depicts stacks of containers 20 and a straddle loader 50 which is partially hidden between the container stacks. Telescoping beams 1 have been retracted between the upper frame 4 and traveling frames 3. Straddle loader 50 is able to remove individual containers 20 even from the tops of high stacks of containers arranged in rows.

Figure 9:
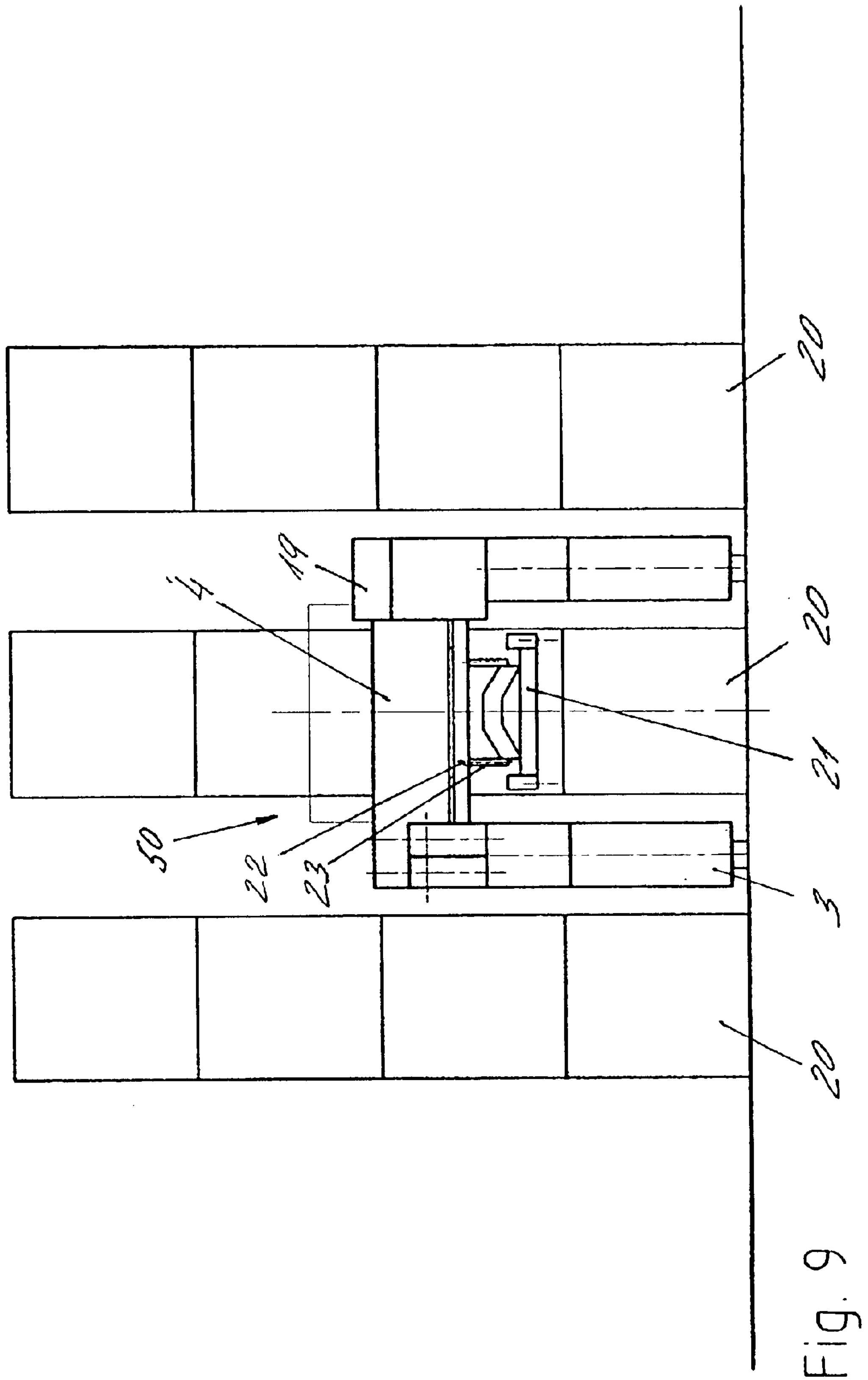
FIG. 9 is an elevational view of stacks of containers with a straddle loader standing in the alley between the container stacks.

FIG. 9 shows a straddle loader 50 positioned in an alley, holding an individual container 20 in its lowermost position. The upper frame 4 and traveling frames 3 are visible, and the operator's compartment 19 appears on the right. The spreader lateral adjustment device 22 and spreader set-down shock absorber 23 are also visible.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A straddle loader for lifting a load, the straddle loader comprising:

- an upper frame having means for lifting the load and a compartment for an operator;
- at least two traveling frames for supporting the load on an underlying ground surface;
- a drive connected to at least one of the at least two traveling frames and operable for propulsion of the straddle loader along the underlying ground surface;
- a lifting system connected between the upper frame and the at least two traveling frames and operable for varying a distance between the upper frame and the at least two traveling frames by uniformly transferring the load to the at least two traveling frames so that the upper frame and the at least two traveling frames remain parallel and perpendicular, the lifting system comprising a plurality of telescoping beams, wherein at least two telescoping beams are associated with each of the at least two traveling frames, said lifting system including means for extending and retracting each said telescoping beam;
- stationary pivot shafts mounted on the upper frame and the at least two traveling frames for connecting each of the plural telescoping beams between the upper frame and a respective one of the at least two traveling frames; and
- a pressure cylinder associated with each of the plural telescoping beams, the pressure cylinder being operably mounted between one of the at least two traveling frames and a respective one of the plural telescoping beams associated with the one of the plural traveling frames, said pressure cylinder being operable for exerting a force on the respective one of the plural telescoping beams for evenly loading the at least two traveling frames and preventing twisting of the upper frame during extension and retraction of the respective telescopic beam, said force exerted by said pressure cylinder being simultaneous and separate from extension and retraction forces generated by the means for extending and retracting.

2. The straddle loader of claim 1, wherein said each of the plural telescoping beams exerts a greater force than the pressure cylinder.

3. The straddle loader of claim 1, further comprising an extension ladder for providing operation access to the compartment.

4. The straddle loader of claim 1, further comprising an adjustable energy chain disposed in one of the plural telescoping beams.

5. The straddle loader of claim 1, further comprising a spreader associated with the load-lifting means and a set-down shock absorber mounted on the spreader.

6. The straddle loader of claim 1, further comprising a driving speed control device for automatically regulating propulsion speed of the vehicle along the underlying ground surface as a function of its height.

7. The straddle loader of claim 1, further comprising a spreader associated with the load-lifting means and a lateral adjustment device mounted on the spreader.

8. The straddle loader of claim 1, wherein the drive for propulsion of the straddle loader is located on one of the plural traveling frames.

9. The straddle loader of claim 1, wherein the means for extending and retracting comprises a cable drive associated with the lifting system for extending and retracting the telescoping beam, wherein the plural telescoping beams comprise two telescoping beams that cross each other, and wherein two pressure cylinders, two telescoping beams, and the cable drive are disposed on each traveling frame.

10. The straddle loader of claim 9, further comprising a bracing element connecting one of the crossing plural telescoping beams to another of the crossing plural telescoping beams at an intersection of the crossing beams, the bracing element having a height adjustable in response to extension and retraction of the plural telescoping beams so that the plural telescoping beams are braced at any position of the telescoping beams.

11. The straddle loader of claim 9, wherein the cable drive comprises an electric motor and a four-track cable drum.

12. The straddle loader of claim 9, wherein each of said telescoping beams comprises three extendable beam parts including a lower beam part, a middle beam part and an upper beam part, each extendable beam part having a proximal end proximal to the traveling frame and a distal end distal from the traveling frame;

- a first support disposed at least partially inside the lower beam part and having a free end extending into the middle beam part and one end joined to the proximal end of the lower beam part;
- a second support disposed at least partially inside the middle beam part and having a free end extending into the upper beam part and one end joined to the proximal end of the middle beam part;
- a third support disposed at least partially outside the middle beam part and having one free end extending into the lower beam part and one end joined to the proximal end of the middle beam part;
- a deflecting pulley disposed on one of the stationary pivot shafts connecting one of the plural telescoping beams to one of the at least two traveling frames;
- a first pulley, a second pulley, and a third pulley mounted on the free end of the respective first support, second support and third support;
- an extension cable attached at one end to the proximal end of the upper beam part and attached at its other end to the proximal end of the lower beam part, the extension cable being disposed so as to slide over the second pulley so as to guide the plural extendable beam parts during extension;
- a return cable attached at one end to the proximal end of the upper beam part and attached at its other end to the distal end of the lower beam part, the return cable being disposed so as to slide on the third pulley to guide the plural extendable beam parts during retraction; and
- a driven cable having a first portion attached at a first end to the proximal end of the middle beam part and a second portion attached at a second end to the proximal end of the middle beam part driven by the cable drive, the first portion being disposed so as to slide over the deflecting pulley and over the first pulley and the second portion being disposed so as to slide over the deflecting pulley, the driven cable being disposed so that a change in length of one of the first and second portions is reciprocal to a change in length in the other of the first and second portions, as the plural extendible beam parts are extended and retracted by operation of the cable drive, the driven cable being driven by the cable drive so as extend the telescoping beam by exerting a force on the first end to retract the telescoping beam by exerting a force on the second end.

13. The straddle loader of claim 12, further comprising two deflecting pulleys mounted parallel to each other on the stationary pivot shaft, one deflecting pulley disposed for guiding the first portion of the driven cable and the other deflecting pulley disposed for guiding the second portion of the driven cable.

* * * * *